April 24, 1934.　　　　C. R. NICHOLS　　　　1,955,760
MANUFACTURING CEMENTITIOUS HOLLOW BODY
Filed Aug. 25, 1932
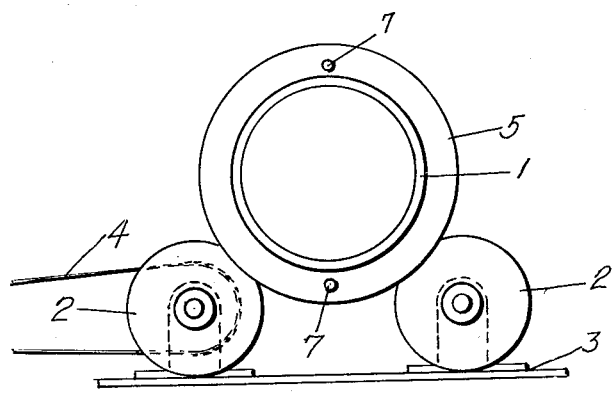
Fig. I.
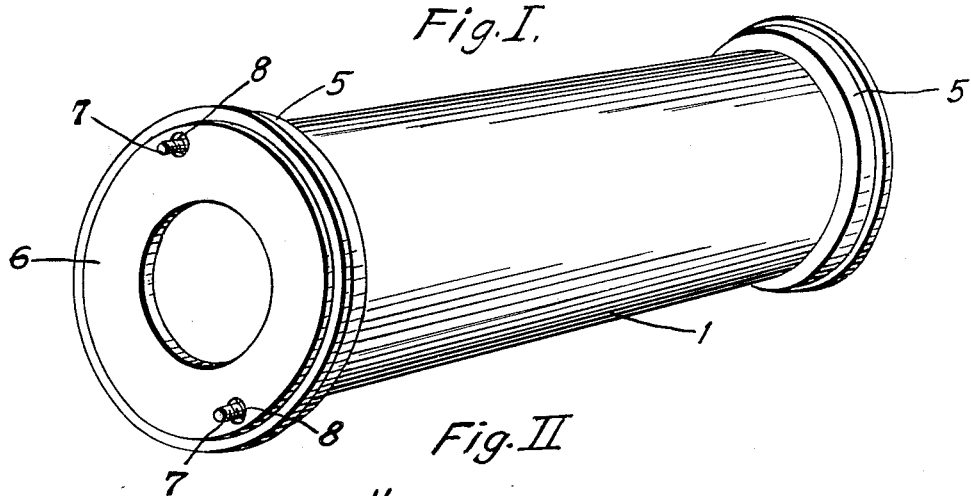
Fig. II
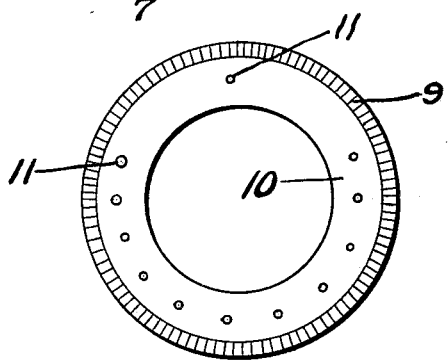
Fig. III
Clifford R. Nichols  INVENTOR.
BY
*L. C. Waldrup* ATTORNEYS.

Patented Apr. 24, 1934

1,955,760

UNITED STATES PATENT OFFICE 1,955,760

MANUFACTURING CEMENTITIOUS HOLLOW BODY

Clifford R. Nichols, West Liberty, Iowa

Application August 25, 1932, Serial No. 630,335

3 Claims. (Cl. 25—154)

This invention consists of a new method of manufacturing hollow bodies of plastic materials, such as: guard-rail and fence posts, lighting standards, telephone poles, porch columns, etc., as well as the product of the process, as a new article of manufacture. The invention will be readily understood by those skilled in the art from the following description together with the accompanying drawing, in which:

Fig. 1 is an end elevational view of a mold for the product of my invention mounted upon means for imparting rotary motion thereto.

Fig. 2 is an elevational view of the mold, showing a pallet for shaping the end of the product as manufactured.

Fig. 3 is a cross section of the article of manufacture, illustrating portions of the cross section of different color.

In the several figures, like references indicate similar elements. 1 being a mold, the cylindrical-like body portion of which is preferably constructed of a single piece of metal, such as a section of steel tubing or cast-iron cylinder; it not being requisite to my process to have a mold that may be fabricated of segments permitting of disassembly, for removal from the product. The body portion of the mold may vary in diameter as required, so as to form the resultant product of a greater diameter at one than at the opposite end. 2—2 are rollers or wheels for supporting mold 1. 3 is a bed plate in which rollers 2 are mounted. 4 is a belt or chain whereby rollers 2—2 may be driven from a source of power, conventional in nature, but not shown herewith. It will be understood that the rollers 2—2 may be provided in the requisite number of pairs in axial alignment to support mold 1 throughout its length; that is, two or more pairs of rollers may be provided.

Apparatus for supporting and rotating the mold are quite well known in the art, such as illustrated in my prior patent, Number 1,457,185, which said prior patent also discloses a mold of one-piece construction suitable for the practicing of my present invention.

Mold 1 is provided with runner rims 5 for engaging rollers 2 to secure the mold in longitudinal displacement of the rollers during the casting operation. A pallet 6 is provided for each end of the mold, of such contour as to shape the respective ends of the body to be formed. Said pallets being removable from the mold when the body is formed, and may be secured to the mold as by providing studs 7 in runner rims 5 and openings 8 through the pallet into which studs may be inserted and threadedly engaged with rims 5.

It is very desirable to produce hollow bodies of plastic materials, and colors on their outer surfaces other than the conventional color of ordinary concrete. It is also desirable that these hollow bodies be of uniform structure and density and therefore capable of rending a definitely required service as well as being of such colors on their outer surfaces as to meet the requirements of the purposes for which they are desired. That is, they may be desired of a clear white color on their outer surface, for such purposes as fence posts and guard rail posts for highways, thus possessing the requisite of ready visibility, not alone in the day time, but particularly at night in the glare of the head lamps of vehicles such as automobiles. Sightliness, or colors harmonizing with buildings in the adjacent area is a very desirable quality of telephone poles and lighting standards for city street lamps, etc.

Furthermore, the utility of such articles as guard rail posts, lighting standards, telephone poles, etc., is clearly influenced by their durability. Such articles formed of concrete are substantially more durable than those of wood. The wooden articles such as guard rail post, must be kept in a state of high visibility by repeated paintings with a very white or aluminum paint. In actual practice, these paintings must be repeated at least once every two years, and preferably, they should be painted each season. The painting alone during the lifetime of a post frequently costs several times more than the initial cost of the post itself. Illustrative of my present invention is the following disclosure of the manufacturing of a highway guard rail post, having a clear, white color permanently fixed into and which remains a part of the post during its lifetime:

In the making of this post as above referred to, I first place mold 1 on rollers 2 by any convenient means, having secured end pallets 6 thereto. I then melt down a fusable material, such as paraffin and pour the same in a molten state into the mold while rotating the latter, which causes the fusable material to be evenly distributed over the entire cylindrical portion of the interior of the mold. And I can prepare this fusable lining of such thickness as desired by the simple expedient of controlling the quantity introduced. It will be understood, of course, that while this lining material is in a molten state when introduced into the mold, it readily solidifies against the surface of the mold upon slightly cooling. I now insert into the mold such reinforcing members as are desired to add strength to the resultant product.

Next, I prepare two quantities of plastic materials. One being composed of sand and gravel or crushed stone of such fineness modulus as desired, mixing therewith ordinary Portland cement in the ratio desired, together with the proper quantity of water to provide for the hydration of the cement.

The other quantity of plastic material is composed of a sand and stone or crushed rock, which may, if desired, be of a marble base, of which there are suitable available supplies commercially within the country. I mix, however, with this specially selected material, a white Portland cement. This white Portland cement possesses the requisite physical and chemical characteristics of ordinary Portland cement, and differs from the gray cements essentially only in that it has the additional quality of pure white color. The cements being of such nature in the two quantities of prepared materials that when the body is formed as presently to be disclosed, the resultant product will constitute a single homogeneous mass, and not be in the form of a laminated structure, having one portion of one material into which a second material is laid. That is, it will be a perfect physical and chemical union throughout the single body.

First, I place inside the mold and distribute upon the fusable material coating the requisite quantity of the prepared material having the white cement, to form a thin section of the resultant body, and complete the building up of the body from that quantity of materials possessing the ordinary or gray cement. The mold being rotated while the materials are being placed therein and rotated sufficiently thereafter to densify the resultant body by centrifugal force as desired to give the requisite characteristics of density and physical hardness to the body before hydration of the cement has occurred.

The mold is then removed from the rotating rollers into a suitable place, such as a kiln, for curing and to secure proper hydration and when the body has attained sufficient strength to withstand ordinary handling stresses, sufficient heat is applied to melt down the fusable material, thus releasing the product from the mold. The end pallets having been removed during the time the fusable material is being melted, the post or such other article as is being manufactured, may readily be removed by a sliding motion similar to the removal of a shell from a gun, thus leaving a smooth finished surface on the manufactured product, which surface is not only smooth but of a permanently fixed color—white—which does not require repeated painting to retain its ready visibility at considerable distances.

The cost of the specially selected materials, inclusive of the white cement, is considerably more than the cost of a like quantity of ordinary materials and the requisite proportion of ordinary gray cement. It frequently being five times as great for the special materials and the white cement. Since the resultant product from either material will be approximately of the same strength, I effect a very great saving in the cost of the post or other body manufactured by my process, by using only a thin veneered coating of the special white cement material upon the entire or a portion of the exposed outer surfaces, and at the same time give to it the requisite quality of a smooth finish in a permanently fixed desired color.

It will be understood, of course, that by varying the material used for the outer section of the post or other such article, that I may produce such articles having fixed colors other than white on their outer surface.

In Fig. 3 of the drawing, the shaded outer portion 9 represents that portion of the body bearing the fixed desired color, while the inner or unshaded portion, 10, represents that portion formed of ordinary materials and ordinary gray Portland cements. 11—11 represents reinforcing throughout the body to give it added strength, consisting of steel rods, wire mesh, or expanded metal.

I am aware that bodies having their outer surfaces of a different color to the main portion of such bodies have been produced heretofore, such as by applying an outer coating by the Gunite process and by mixing with the body materials which would not form into an homogeneous structure when finished, also in the making of artificial stone. The novel method of manufacture set forth herein permits me to manufacture these articles more economically, having a very definite uniform character throughout and having the color desired permanently fixed in the body of the product.

It of course will be understood that I may use the color fixed cementitious material for forming the outer coat for the finished product upon any part of the outer surface as well as the whole of the outer surfaces.

What I claim is:

1. The method of manufacturing a hollow body out of cementitious plastic materials centrifugally which consists in lining a rotatable conforming member with fusible material, rotating the conforming member and spreading against the fusible material a layer of cementitious plastic material having a predetermined color, then in spreading against the first named plastic material another layer of plastic material having substantially the same physical and chemical characteristics as the first layer, but a different color, the conforming member having been rotated at relatively non-densifying speed, then in continuing rotation but at relatively densifying speeds to densify the body and finally melting down the fusable material, curing the body and removing the finished product from the conforming member.

2. The method of manufacturing a hollow body out of cementitious plastic materials centrifugally which consists of rotating a conforming member and spreading thereagainst a layer of cementitious plastic material having a predetermined color; then in spreading against the first layer a second layer having substantially similar physical and chemical characteristics but a different color, the conforming member having been rotated at relatively non-densifying speeds, then in continuing rotation but at relatively densifying speeds to densify the body and finally in curing and removing the body from the conforming member.

3. The method of manufacturing a hollow body of cementitious plastic materials which consists of superimposing layers of cementitious plastic materials of similar physical and chemical characteristics, but of different color, one upon another against a rotating conforming member without substantial densification, then in rotating the conforming member with the superimposed layers of materials to densify the latter and finally in curing the resultant product and removing it from the conforming member.

CLIFFORD R. NICHOLS.